United States Patent [19]

Hunt

[11] Patent Number: 5,632,145
[45] Date of Patent: May 27, 1997

[54] INTERNAL COMBUSTION ENGINE WITH RIFLED INTAKE AND EXHAUST MANIFOLDS

[76] Inventor: Robert N. Hunt, 1415 Lafayette La., Marietta, Ga. 30068

[21] Appl. No.: 615,679

[22] Filed: Mar. 13, 1996

[51] Int. Cl.$^6$ .................................................. F02B 31/00
[52] U.S. Cl. .................. 60/323; 123/184.21; 123/193.5; 123/306
[58] Field of Search .................. 123/184.21, 184.24, 123/184.32, 184.34, 184.39, 188.14, 193.5, 306, 590; 60/272, 302, 313, 323

[56] References Cited

U.S. PATENT DOCUMENTS

| | | | |
|---|---|---|---|
| 1,288,640 | 12/1918 | Mauck | 123/184.39 X |
| 1,305,174 | 5/1919 | Smith | 123/184.39 X |
| 2,034,119 | 3/1936 | Shebat | 137/160 |
| 2,390,913 | 12/1945 | Barrett | 60/13 |
| 2,423,602 | 7/1947 | Magdeburger | 60/13 |
| 3,768,260 | 10/1973 | Glenn | 60/324 |
| 3,824,791 | 7/1974 | Beller et al. | 60/303 |
| 4,022,019 | 5/1977 | Garcea | 60/282 |
| 4,339,918 | 7/1982 | Michikawa | 60/316 |

FOREIGN PATENT DOCUMENTS

| | | | |
|---|---|---|---|
| 971446 | 7/1975 | Canada | 123/184.21 |
| 291807 | 7/1991 | Germany | 123/193.5 |
| 291808 | 7/1991 | Germany | 123/193.5 |
| WO85/01778 | 4/1985 | WIPO | 123/184.21 |

OTHER PUBLICATIONS

Text book "Internal Combustion Engines and Air Pollution" by Edward F. Obert, Published by Harper & Row, Copyright 1973, pp. 412 through 424.

*Primary Examiner*—Tony M. Argenbright
*Attorney, Agent, or Firm*—Kennedy, Davis & Kennedy

[57] ABSTRACT

A multi-cylinder internal combustion engine having at least one cylinder head with intake and exhaust ports and having an intake manifold with a common chamber and individual intake runners leading from the common chamber to the intake ports. The individual runners each have interior wall surfaces which are rifled to produce a swirling flow as the intake gases move through the individual intake runners from the common chamber to the intake ports of the cylinder head. This rifling is in the form of a plurality of helical vanes, with the helix being tighter near the intake port than near the common chamber. The helical vanes comprise a first set of helical vanes that extend from adjacent the intake ports to adjacent the common chamber and a second set of helical vanes that extend from adjacent the intake ports to a position intermediate the intake ports and the common chamber. An improved exhaust manifold is also disclosed for use with the internal combustion engine. The improved exhaust manifold includes a common chamber or header and individual exhaust runners extending between the common chamber and the exhaust ports of the cylinder head. The exhaust runners each have an interior wall surface which is rifled to produce a swirling flow of exhaust gases from the exhaust ports through the individual runners of the exhaust manifold to the common chamber of the exhaust manifold.

15 Claims, 5 Drawing Sheets

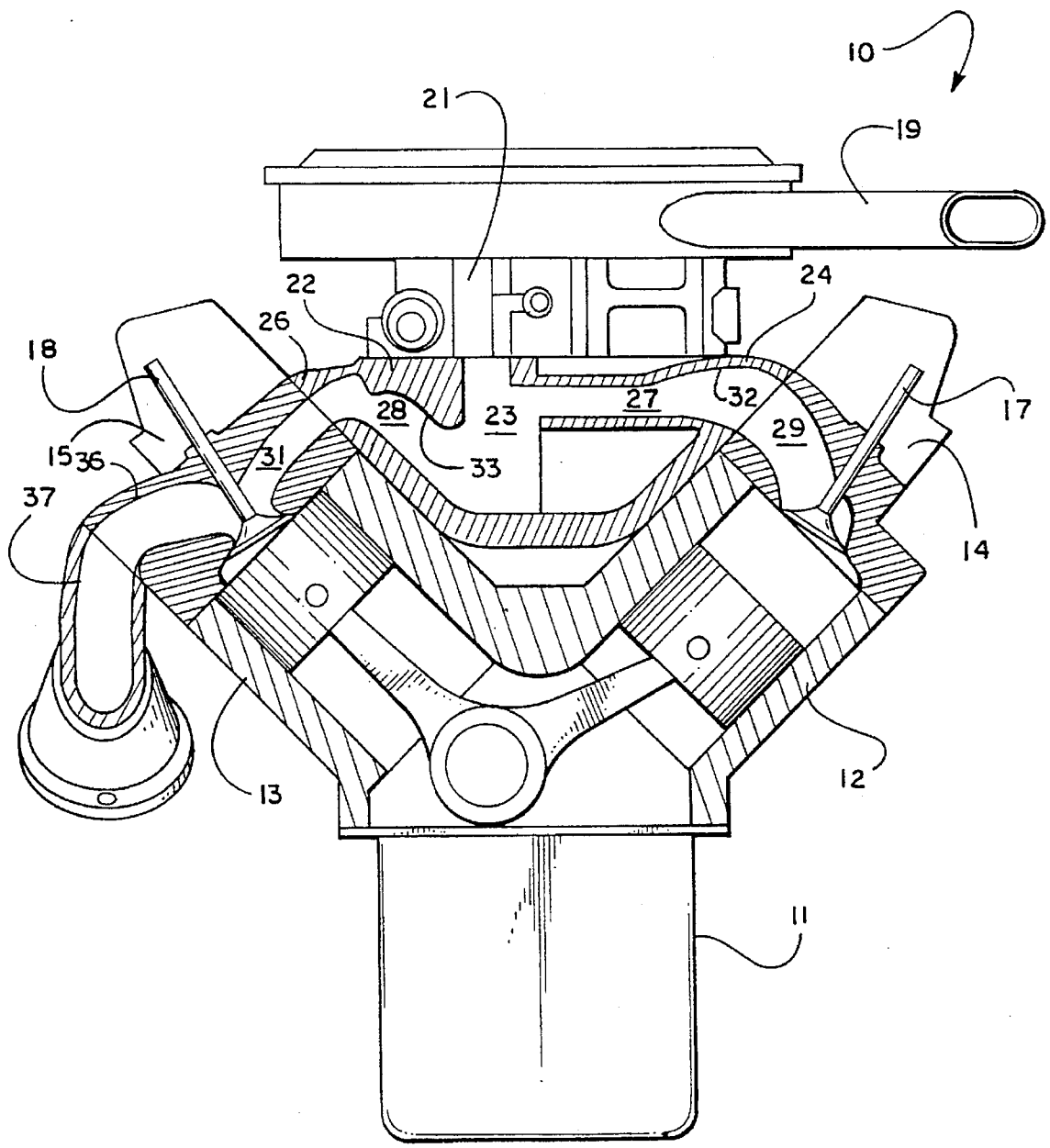
Fig_1

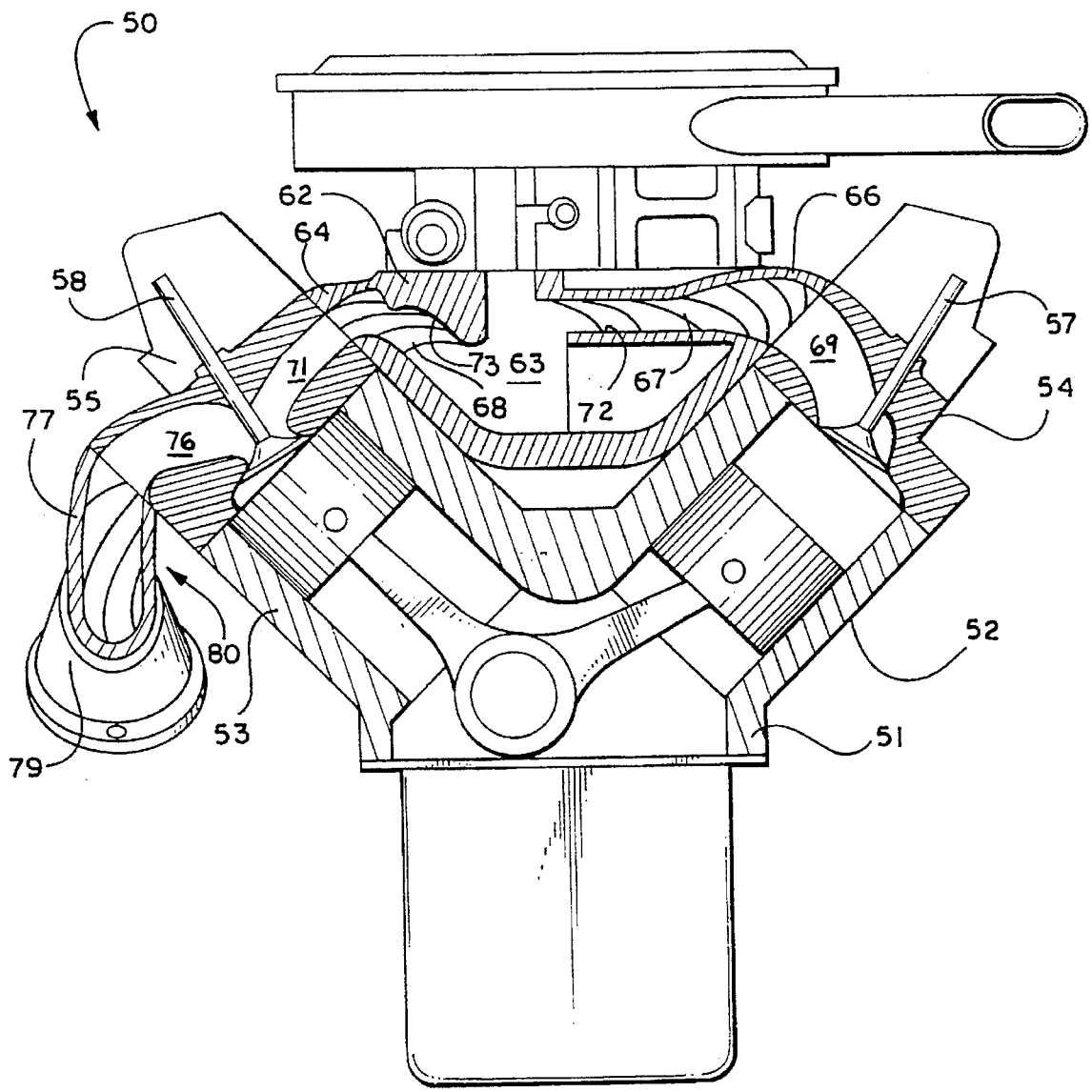
Fig_2

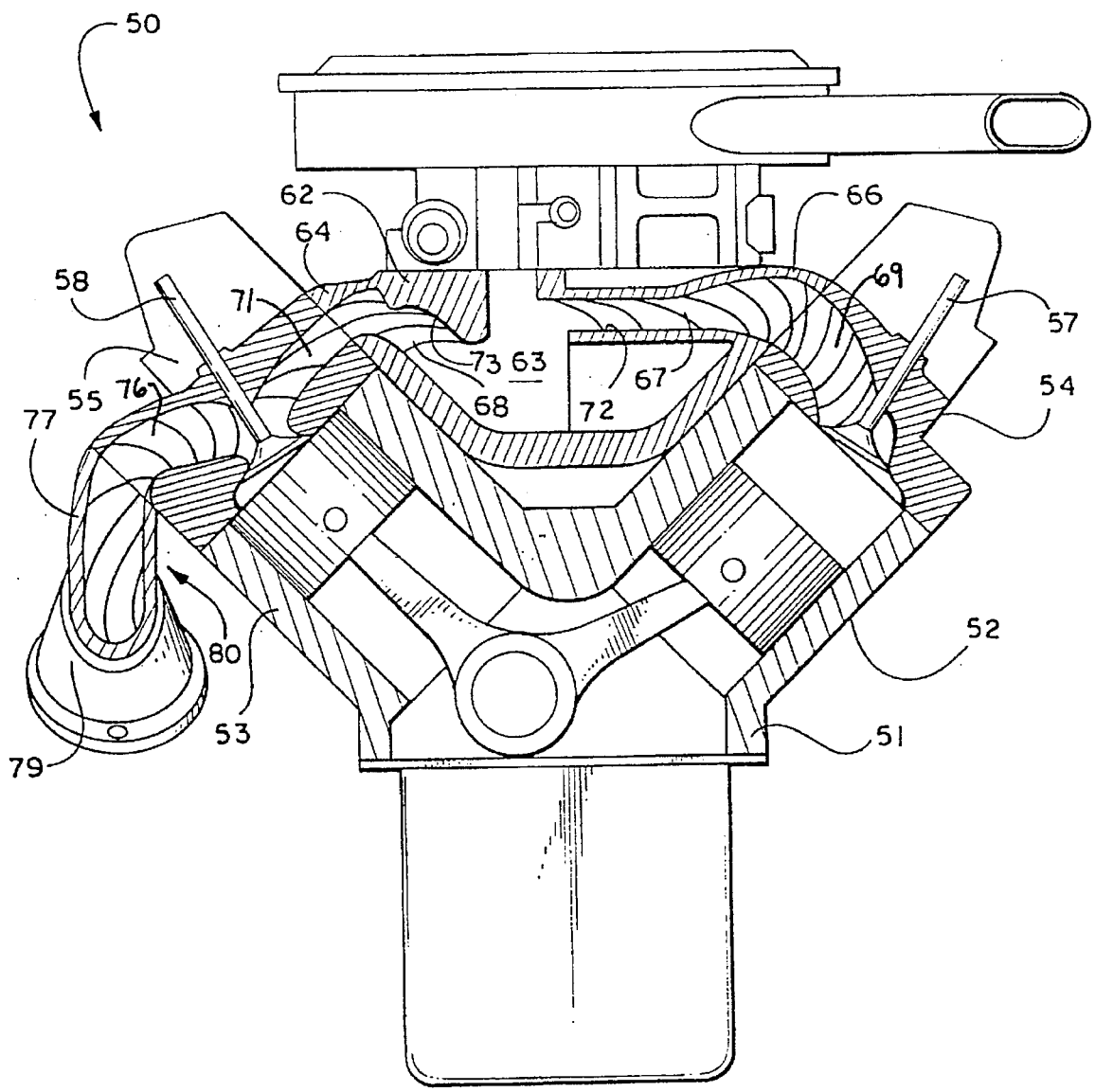
Fig_2A

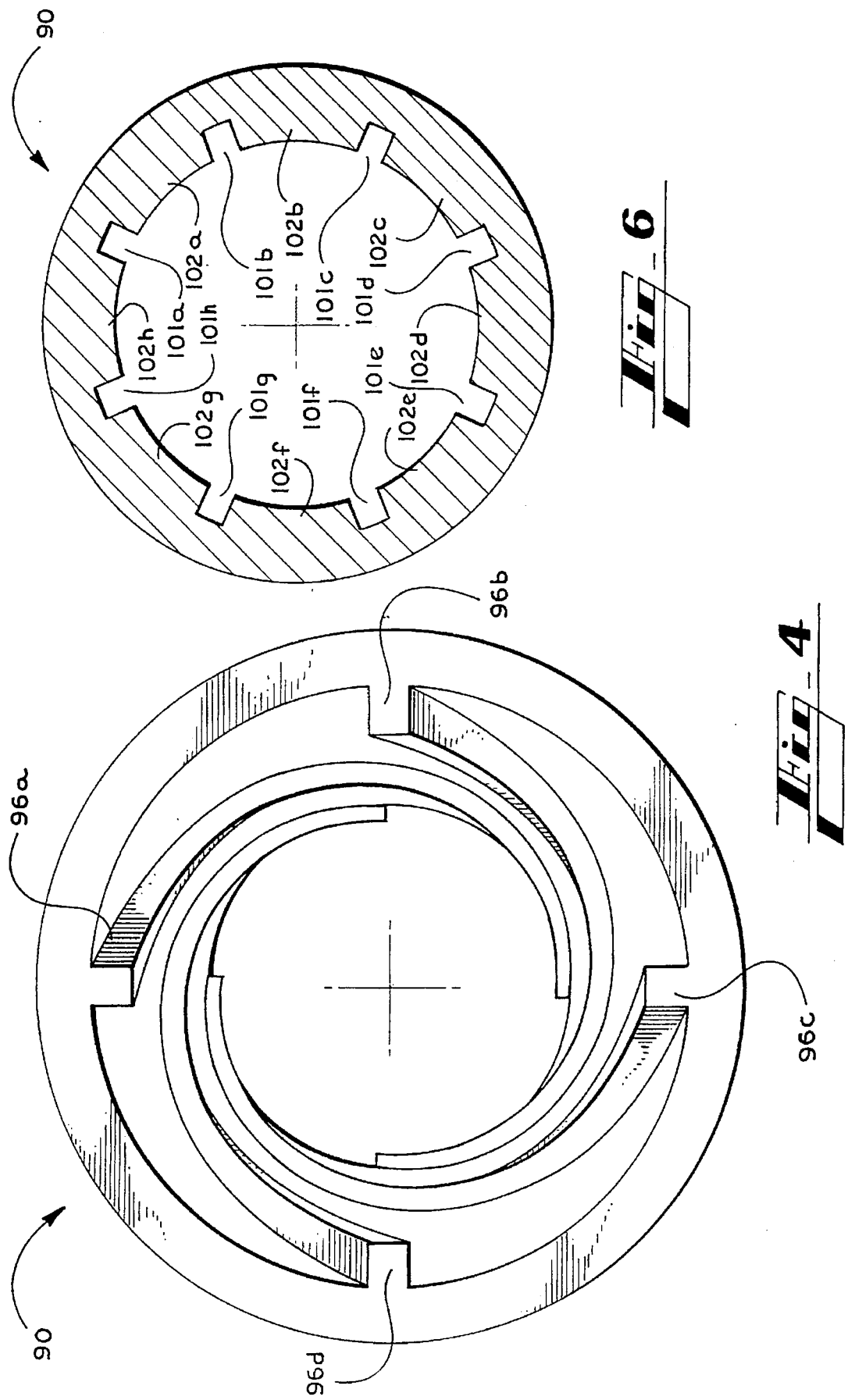

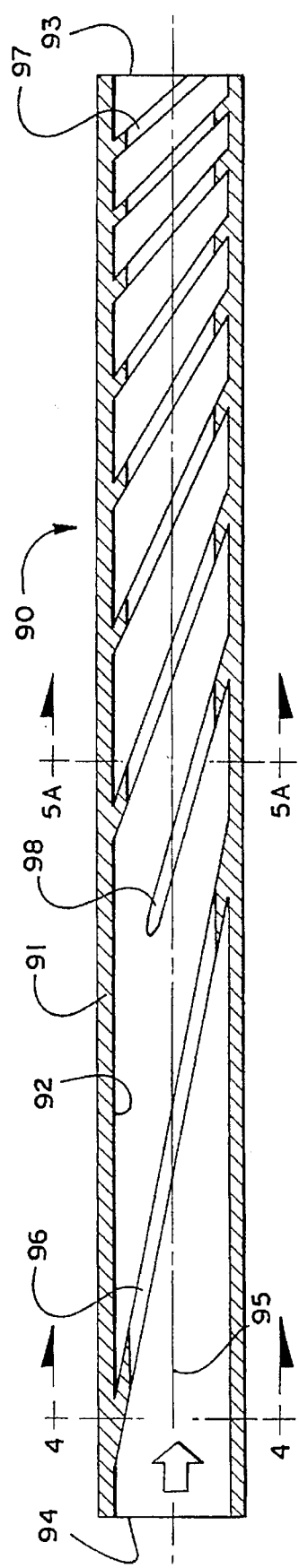
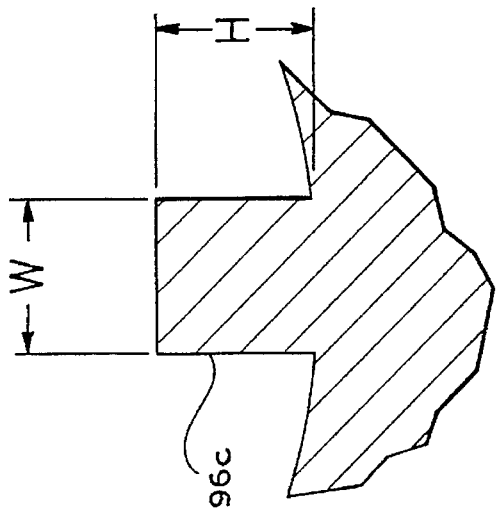
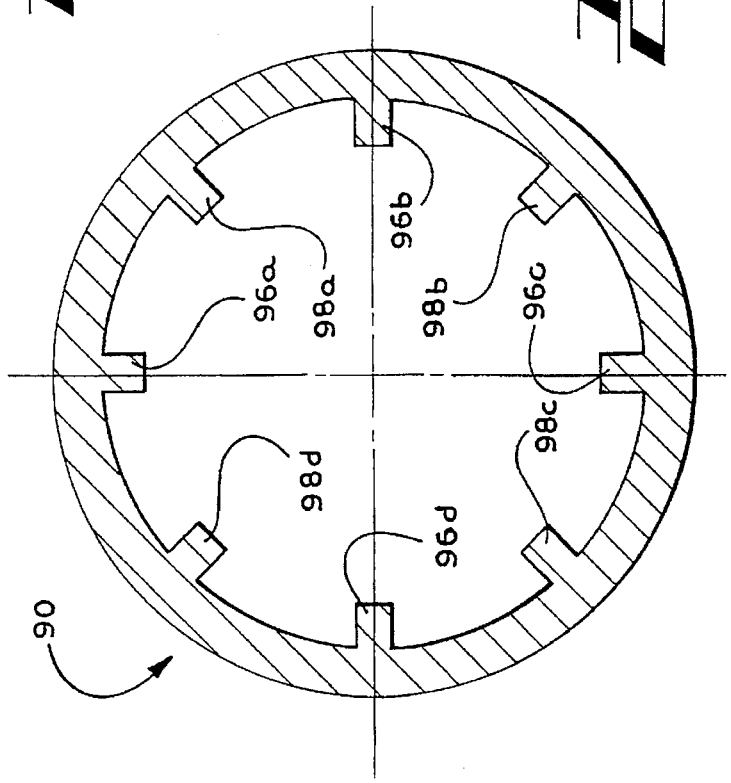

INTERNAL COMBUSTION ENGINE WITH RIFLED INTAKE AND EXHAUST MANIFOLDS

TECHNICAL FIELD

The present invention relates generally to internal combustion engines and more particularly relates to improved intake and exhaust manifolds for internal combustion engines.

BACKGROUND OF THE INVENTION

In a conventional or typical automotive-type internal combustion engine, intake air is drawn through an intake manifold to the combustion chamber in the cylinder head of the engine. Typically, the intake manifold includes a header or common chamber into which air is drawn from atmosphere (or through a carburetor) and a number of individual intake runners or legs lead from the header to intake ports formed in the cylinder heads. Typically, a carburetor or fuel-injection system delivers a metered amount of fuel into the airstream which is, in part, vaporized and atomized in the airstream in the intake manifold.

During operation of the internal combustion engine, air is drawn into the combustion chamber through the intake manifold where it is usually charged with fuel prior to entering or after entering the combustion chamber. Once the combustion chamber has drawn in sufficient air and/or fuel, an intake valve closes to close off the intake manifold from the combustion chamber. This closing of the intake valve causes the air progressing through the intake manifold to stop abruptly, to bounce off the closed valve, and sends a reversed flow echo up through the intake manifold. When the intake valve reopens and the next charge of air is to be drawn in, the air flow echo heading back up the intake then stops and reverses flow again toward the combustion chamber. A similar action takes place in the exhaust except with a push-pull motion. These actions result in a rather jerky motion of air and/or fuel and combustion gases within the intake and exhaust manifolds and results in reduced efficiency of the engine.

Conventionally, the goals of typical intake manifold designs are to provide good mass division, good quality division, and high volumetric efficiency at full throttle. See, *Internal Combustion Engines and Air Pollution,* Edward F. Obert, 3rd. Ed., Copyright 1973, Harper & Row, at pp. 420–421. Good mass division is achieved when the entering fuel, additives, and air are divided equally among the cylinders at all speeds and loads. Good quality division is achieved when the combustion charge received by each cylinder is well mixed and has the same physical and chemical characteristics.

It has been known in the prior art to try to achieve these goals by providing intake manifolds with similar passageways to all cylinders, turbulence inducers, localized hot spots to reduce large liquid droplets, and smooth interior walls to reduce the thickness of the liquid film flowing along the interior walls. For example, U.S. Pat. No. 2,390,913 of Barrett discloses the use of a large header having internal helical vanes to direct the air flow to individual cylinders. The runners of Barrett that lead from the header to the individual cylinders have smooth interior walls. U.S. Pat. No. 2,423,602 of Magdeburger shows a similar type of arrangement.

While current automotive manifold technology is adequate generally, them remains yet a need for a manifold which provides increased power and fuel efficiency. It is to the provision of such a manifold that the present invention is primarily directed.

SUMMARY OF THE INVENTION

Briefly described, in a first preferred form the present invention comprises an improvement to a multi-cylinder internal combustion engine of the type having a cylinder head with intake and exhaust ports and having an intake manifold with a common chamber and individual runners leading from the common chamber to the intake ports. The improvement comprises that the individual runners each have interior wall surfaces which are rifled to produce a swirling flow as the intake gases move through the individual runners from the common chamber to the intake ports of the cylinder heads. Preferably, this rifling is in the form of a plurality of helical vanes, with the helix being tighter near the intake ports than near the common chamber. Also preferably, the helical vanes comprise a first set of helical vanes that extend from adjacent the intake ports to adjacent the common chamber and a second set of helical vanes that extend from adjacent the intake ports to a position intermediate the intake ports and the common chamber.

Preferably, the improvement also comprises an improved exhaust manifold for use with the internal combustion engine. The improved exhaust manifold includes a common exhaust chamber or header and individual exhaust runners extending between the common exhaust chamber and the exhaust ports of the cylinder head. The exhaust runners each have an interior wall surface which is rifled to produce a swirling flow of exhaust gases from the exhaust ports through the individual runners of the exhaust manifold to the common exhaust chamber of the exhaust manifold. Here, the helical vanes are also progressive, with the helix being tighter near the exhaust ports than near the common exhaust chamber of the exhaust manifold.

In a second preferred form, the invention comprises an intake manifold for use with a multi-cylinder internal combustion engine of the type having at least one cylinder head with intake ports and exhaust ports. The intake manifold comprises a header and a plurality of intake runners extending between the header and the intake ports of the cylinder head. The intake runners each have an interior wall surface with spiral vanes formed therein for causing intake gases to swirl as they flow from the header through the intake runners to the intake ports of the cylinder head.

The spiral runners in the intake manifold and the exhaust manifold have been found to be very advantageous, producing a strongly swirling flow of intake gases. This results in markedly better mixing of the air and fuel mixture, achieving more complete and powerful combustion. This provides increased power and results in greater fuel efficiency due to a more effective utilization of the fuel being delivered to the combustion chamber. Also, it appears that the tightly swirling flow of the air and fuel mixture as it enters the intake port continues to swirl even for a time after the intake valve is closed. This swirling action appears to be carried over and continued as the valve re-opens and the fresh charge of air and fuel is drawn into the combustion chamber providing a swirling effect inside the combustion chamber. Likewise, the swirling flow adjacent the exhaust port appears to help draw out the combustion products from within the combustion chamber and through the exhaust port.

Accordingly, it is a primary object of the present invention to provide an improved manifold design which increases the power of an internal combustion engine.

It is another object of the present invention to provide an improved manifold design which increases the fuel efficiency of an internal combustion engine.

It is another object of the present invention to provide an improved intake manifold design which provides improved mixing of the air and fuel charge being delivered to the combustion chamber.

These and other objects, advantages, and features of the present invention will become apparent upon reading the following specification in conjunction with the accompanying drawing figures.

BRIEF DESCRIPTION OF THE DRAWING FIGURES

FIG. 1 is a sectional, schematic illustration of a prior art internal combustion engine.

FIG. 2 is a sectional, schematic illustration of an improved internal combustion engine according to a first preferred form of the invention, having rifled intake and exhaust manifolds.

FIG. 2A is a sectional, schematic illustration of an improved internal combustion engine according to a first preferred form of the invention, having rifled intake and exhaust manifolds.

FIG. 3 is a sectional, schematic illustration of a rifled runner portion of the manifolds of FIG. 2, with the runner depicted being shown as a straight-length in order to better illustrate the principles of the invention.

FIG. 4 is an end view of the runner of FIG. 3, in a slightly modified form.

FIG. 5A is a cross-section of the runner of FIG. 3.

FIG. 5B is a detailed view of a portion of the runner depicted in FIG. 5A.

FIG. 6 is a cross-section view of a runner according to a second preferred form of the invention.

DETAILED DESCRIPTION OF THE PREFERRED EMBODIMENTS

Referring now to the drawing figures, wherein like reference numerals represent like parts throughout the several views, FIG. 1 shows a prior art engine design. The prior art engine 10 depicted in FIG. 1 is of the "V" construction having a crankcase 11, first and second cylinder banks 12 and 13, and first and second cylinder heads 14 and 15. Of course, each combustion chamber includes an intake valve and an exhaust valve, such as intake valve 17 and exhaust valve 18.

In this typical prior art engine arrangement, air is drawn in through an air cleaner 19 and passes through a carburetor 21 where fuel is mixed with the airstream to create an air and fuel mixture. The air and fuel mixture is delivered to the individual cylinders by an intake manifold 22 which has a common chamber (or header) 23 and individual intake runners, such as runners 24 and 26. The runners 24 and 26 define runner passageways 28 and 29 which communicate with intake ports 29 and 31. In this way, the air/fuel mixture is delivered to the intake valves for induction into the combustion chambers for combustion. Conventionally, the interior wall surfaces 32 and 33 have been made to be smooth in order to reduce the thickness of the liquid film of fuel flowing slowly along the interior wall surfaces of the manifold.

The prior art engine 10 also includes exhaust ports, such as exhaust port 36, associated with each exhaust valve, such as exhaust valve 18. An exhaust manifold, only an exhaust runner portion 37 of which is shown, is attached to each cylinder head and the exhaust manifold includes a common chamber or header portion and individual runners. Each individual exhaust runner is in communication with one of the exhaust ports.

FIG. 2 shows an improved engine construction according to a first preferred form of the invention. The improved internal combustion engine 50 has much of the same components as prior art engine 10. For example, it includes a crankcase 51, first and second cylinder banks 52 and 53, and first and second cylinder heads 54 and 55. It also includes intake valves and exhaust valves, such as intake valve 57 and exhaust valve 58. The improved internal combustion engine 50 includes an intake manifold 62 having a header or common chamber 63 and individual intake runners, such as intake runners 64 and 66. The intake runners define internal passageways, such as passageways 67 and 68. These passageways communicate with intake ports in the cylinder heads, such as intake ports 69 and 71. The intake runners extend from the header 63 to the intake ports 69 and 71. The intake runners 64 and 66 have outlets adjacent the intake ports through which the air and fuel mixture flows. The interior wall surfaces, such as interior wall surfaces 72 and 73, are provided with a plurality of helical or spiral vanes for creating a swirling flow of the air and fuel mixture as it flows along within the intake runners to the intake ports. These helical vanes are schematically depicted in FIG. 2 and will be described in more detail in reference to subsequent figures.

The improved internal combustion engine 50 also includes exhaust manifolds, such as exhaust manifold 80 having a plurality of rifled exhaust runners, such as exhaust runner 77, communicating between the exhaust port 76 a header portion or common chamber 79 in the exhaust manifold.

FIG. 2A shows an alternative embodiment in which the engine 50 is provided with rifling (helical vanes) in the intake ports and exhaust ports, such as in ports 69, 71, and 76.

Referring now to FIG. 3, an illustrative intake runner 90 is depicted. The illustrative intake runner 90 is shown as being straight. However, those skilled in the art will readily recognize that in a normal situation the intake runners are not straight, but rather are curved in any number of configurations. However, in order to assist the reader in understanding the nature of the rifling of the intake runner according to the present invention, a straight intake runner is considered and discussed. The intake runner 90 includes an intake runner wall 91 having an interior wall surface 92. The interior wall surface 92 is provided with a plurality of helical vanes, such as vanes 96, 97, and 98. The intake runner 90 has an outlet end 93 and an inlet end 94. The inlet end 94 is adjacent to the header or common chamber of the intake manifold and is in fluid communication therewith. Likewise, the outlet end 93 of the intake runner 90 is adjacent and in fluid communication with an intake port in the cylinder head.

The intake runner 90 includes helical vanes which, as depicted, are progressive. That is, the helical vanes start off at a gentle angle and increase their pitch to a more aggressive angle. This tightening of the helix angle eases the transition of the flow from a normal flow to that of a swirling flow, and increases the amount of swirl. Near the inlet end, the first helical vane 96 is at a small angle, such as 10°, with respect to a longitudinal axis 95 of the intake runner 90. At the other end (the outlet end) 94 of the intake runner 90, the helical vane 97 is at a significantly greater angle with respect to the longitudinal axis 95. For example, the helical vane 97 is at an angle of roughly 40° to 50° with respect to the longitudinal axis 95.

To further assist the transition of the flow, some of the helical vanes extend over the entire length of the intake runner 90, while others of the helical vanes begin partway along the length of the intake runner 90 and extend to the outlet end 93. For example, helical vane 96 begins adjacent the inlet end 94 of the intake runner, while helical vane 98 begins roughly ⅓ of the way along the length of the intake runner 90.

In the prototype actually constructed and tested, four helical vanes extend all the way from the inlet end to the outlet end of the intake manifold, while four additional helical vanes are positioned laterally therebetween and extend from a point intermediate the inlet and outlet ends to the outlet end of the intake runner 90. Those skilled in the art will recognize that more or fewer vanes can be provided, as desired.

FIG. 4 is a sectional view of the intake runner 90 of FIG. 3 taken along the viewlines 4—4, but depicting only four (4) vanes, rather than 8, in order to better illustrate the principles of the invention. As seen in FIG. 4, the intake runner 90 begins with four helical vanes 96a, 96b, 96c, and 96d. As can be seen from FIG. 5A, taken along the lines of viewlines 5A—5A in FIG. 3, after a certain point, the intake runner includes eight helical vanes, vanes 96a-96d and vanes 98a-98d.

The vanes depicted in connection with FIGS. 3-5B are formed by upstanding ridges which stand proud of the otherwise cylindrical inner surface of the intake runner 90. In such a construction, the width "W" of the ridges is not substantially greater than the height "H" of the ridges. In fact, normally the height would be slightly greater than the width. On the other hand, the vanes can be provided by the alternative arrangement depicted in FIG. 6. As shown in FIG. 6, instead of using upstanding ridges, grooves can be formed in the wall of the intake runner 90. As shown in FIG. 6, grooves 101a-101h are formed in the wall of the intake runner, leaving "teeth" or wide ridges 102a-102h therebetween. As can be seen in FIG. 6, the resulting ridges between the grooves are rather squat, with the width of the ridges being substantially greater than their height.

The construction of the exhaust manifold is substantially the same, except that the progressive nature of the helix or spiral is reversed. The helix is tightest adjacent the exhaust ports where the exhaust enters the exhaust runners and is less tight as the runners reach the header portion of the exhaust manifold. In this way, the swirling action is believed to be continued and to help draw the combustion products out of the intake port (and out of the combustion chamber). Like the intake runners, the exhaust runners can be rifled by the provision of upstanding ridges or by forming grooves in the walls of the exhaust runners.

The shutting of the intake valve after the combustion chamber has been filled does not result in a reverse vacuum echo being sent up the intake manifold as the air is swirling at such a rate to allow continued swirling of the air behind the valve. Air progressing down the intake manifold is believed to be swirling at various speeds depending on where in the manifold it has progressed. This swirling action tends to prevent a reverse vacuum echo from being sent up the intake manifold.

Within the combustion chamber the swirling mixture is burned and the exhaust valve is opened to release the combustion gases. To maintain the swirling action and improve efficiency of the engine's operation, the swirling motion is maintained in the exhaust manifold as well. The angle of the recesses/ridges in the exhaust manifold preferably begins at the same angle and number of recesses/ridges as approximately midway down the intake manifold (roughly 30°). From this initial setting of recesses/ridges the angle preferably should flatten only slightly with respect to the manifold circumference. This allows the swirling action to continue and provides a slight increase in the swirling, bringing about a tightening or drawing of the burned mixture from outside the combustion chamber.

Tests were conducted on a six-cylinder, horizontally opposed engine of European design and an eight-cylinder, water-cooled engine of American design (V-8). Results were recorded in acceleration comparisons and gasoline mileage of the automobile.

| TEST RESULTS | | |
|---|---|---|
| | 6 Cyl. Air Cooled | 8 Cyl. Water Cooled |
| Unmodified Engine | | |
| Acceleration to 60 mph | 10.1 Sec. | 9.8 Sec. |
| Gasoline Mileage | 16.3 mpg | 11.4 mpg |
| Engine With Rifled Manifold and ports | | |
| Acceleration to 60 mph | 9.5 Sec. | 9.1 Sec. |
| Gasoline Mileage | 16.9 mpg | 12.6 mpg |

Thus, the testing showed the invention to increase power (better acceleration times) and to increase efficiency (fuel economy).

While the principles of the invention have been illustrated in connection with V-type engines, the present invention has ready application to other engine types, such as in-line, horizontally opposed, rotary, radial, etc. Moreover, in addition to being applicable to normally-aspirated engines, the present invention is also applicable to charged engines, such as super-charged or turbo-charged engines. It is believed that for normally-aspirated engines the helical vanes should be formed by upstanding ridges (such as shown in FIGS. 3-5B), and for charged engines the helical vanes should be formed by grooves (such as shown in FIG. 6). Also, grooves and ridges could be combined in charged engines.

While the invention has been described in preferred forms, it will be apparent to those skilled in the art that many modifications, additions, and deletions may be made therein without departing from the spirit and scope of the invention as set forth in the following claims.

What is claimed is:

1. In a multi-cylinder internal combustion engine of the type having a cylinder head with intake and exhaust ports and having an intake manifold with a common chamber and individual runners leading from the common chamber to the intake ports, the individual runners having outlets adjacent the intake ports, the improvement therein comprising that the individual runners each have interior wall surfaces which are helically rifled to produce a swirling flow as intake gases are moved through the individual runners to the intake ports of the cylinder head, and wherein said helical rifling is progressively helical, with the helix being tighter near the outlets of the runners than near the common chamber.

2. The improvement of claim 1 wherein the helix has a helix angle of about 40° to 50° near the intake port.

3. The improvement of claim 1 wherein the helix has a helix angle of about 10° near the common chamber.

4. In a multi-cylinder internal combustion engine of the type having a cylinder head with intake and exhaust ports and having an intake manifold with a common chamber and individual runners leading from the common chamber to the intake ports, the individual runners having outlets adjacent the intake ports, the improvement therein comprising that the individual runners each have interior wall surfaces which are rifled to produce a swirling flow as intake gases are moved through the individual runners to the intake ports of the cylinder head, and wherein said interior wall surface is rifled with first and second rifling means, the first rifling means extending from adjacent the outlets to adjacent the common chamber, and the second rifling means extending from adjacent the outlets to a position intermediate the outlets and the common chamber.

5. In a multi-cylinder internal combustion engine of the type having a cylinder head with intake and exhaust ports and having an intake manifold with a common chamber and individual runners leading from the common chamber to the intake ports, the individual runners having outlets adjacent the intake ports, the improvement therein comprising that the individual runners each have interior wall surfaces which are rifled to produce a swirling flow as intake gases are moved through the individual runners to the intake ports of the cylinder head, and wherein the internal combustion engine further has an exhaust manifold having a common chamber and individual exhaust runners extending from the common chamber of the exhaust manifold to the exhaust ports of the cylinder head, the improvement further comprising that the individual exhaust runners each have an interior wall surface which is rifled to produce a swirling flow of exhaust gases from the exhaust ports through the individual exhaust runners of the exhaust manifold to the common chamber of the exhaust manifold.

6. In a multi-cylinder internal combustion engine of the type having a cylinder head with intake and exhaust ports and having an intake manifold with a common chamber and individual runners leading from the common chamber to the intake ports, the individual runners having outlets adjacent the intake ports, the improvement therein comprising that the individual runners each have interior wall surfaces which are rifled to produce a swirling flow as intake gases are moved through the individual runners to the intake ports of the cylinder head, and further comprising that the intake and exhaust ports are rifled.

7. In a multi-cylinder internal combustion engine of the type having a cylinder head with intake and exhaust ports and having an exhaust manifold with a common chamber and individual exhaust runners leading from the common chamber to the exhaust ports, the improvement therein comprising that the individual exhaust runners each have interior wall surfaces which are rifled to produce a swirling flow as the exhaust gases are moved from the exhaust ports through the individual exhaust runners to the common chamber.

8. The improvement of claim 7 wherein said interior wall surfaces of the individual exhaust runners are rifled by the provision of elongate, narrow, helical grooves.

9. The improvement of claim 7 wherein said interior wall surfaces of the individual exhaust runners are rifled by the provision of elongate, narrow, helical ridges.

10. The improvement of claim 7 wherein said rifled interior wall surfaces of the individual exhaust runners are helical.

11. The improvement of claim 10 wherein the helical interior wall surfaces of the individual exhaust runners are progressive, with the helix being tighter near the exhaust port than near the common chamber of the exhaust manifold.

12. An intake manifold for use with a multi-cylinder internal combustion engine of the type having at least one cylinder head with intake ports and exhaust ports, said intake manifold comprises:

a header;

a plurality of intake runners extending between said header and the intake ports of the cylinder head, said intake runners each having an outlet and an interior wall surface with spiral vanes formed therein for causing intake gases to swirl as they flow from said header through said intake runners to the intake ports of the cylinder head, and wherein said vanes are progressively tighter near said outlets than near said header.

13. An intake manifold as claimed in claim 12 wherein adjacent said outlets, said spiral vanes are at an angle of roughly between 40° and 60° with respect to a longitudinal axis of the intake runners.

14. An intake manifold as claimed in claim 12 wherein adjacent said header, said spiral vanes are at an angle of roughly 10° with respect to a longitudinal axis of the intake runner.

15. An intake manifold for use with a multi-cylinder internal combustion engine of the type having at least one cylinder head with intake ports and exhaust ports, said intake manifold comprises:

a header;

a plurality of intake runners extending between said header and the intake ports of the cylinder head, said intake runners each having an outlet and an interior wall surface with spiral vanes formed therein for causing intake gases to swirl as they flow from said header through said intake runners to the intake ports of the cylinder head, and wherein said spiral vanes comprise a first set of vanes extending from said header to adjacent said outlets and a second set of vanes extending from a position intermediate said header and said outlets to said outlets.

* * * * *